(12) United States Patent
Kuzmich et al.

(10) Patent No.: US 6,267,429 B1
(45) Date of Patent: Jul. 31, 2001

(54) MULTI-POSITION VEHICLE TAILGATE ASSEMBLY

(75) Inventors: Keith Alan Kuzmich, Commerce Township; Norman william Fasecas, Westland; Robert J. Garby, Northville, all of MI (US)

(73) Assignee: Ford Global Technologies, Inc., Dearborn, MI (US)

(*) Notice: Subject to any disclaimer, the term of this patent is extended or adjusted under 35 U.S.C. 154(b) by 0 days.

(21) Appl. No.: 09/698,563

(22) Filed: Oct. 27, 2000

(51) Int. Cl.⁷ ................................................. B60P 1/02
(52) U.S. Cl. ........................................... 296/50; 296/57.1
(58) Field of Search ........................... 296/50, 57.1, 61, 296/58, 59, 60; 49/325, 331

(56) References Cited

U.S. PATENT DOCUMENTS

| | | |
|---|---|---|
| 563,173 * 6/1896 | Herriman | 296/59 |
| 572,869 * 12/1896 | Crawford | 296/58 |
| 659,575 * 10/1900 | Carpenter | 296/59 |
| 3,572,455 3/1971 | Brueske . | |
| 3,795,329 3/1974 | Martin et al. . | |
| 4,164,293 8/1979 | Oelberg . | |
| 4,884,838 12/1989 | Slater . | |
| 5,312,148 * 5/1994 | Morgan | 296/61 |
| 5,312,150 5/1994 | Quam . | |
| 5,468,114 * 11/1995 | Hickerson | 296/61 |
| 5,707,095 1/1998 | Pribak et al. . | |
| 5,813,714 * 9/1998 | Lipinski et al. | 296/61 |
| 5,988,725 * 11/1999 | Cole | 296/61 |
| 6,082,801 * 7/2000 | Owen et al. | 296/57.1 X |
| 6,126,223 * 10/2000 | Rayburn | 296/57.1 |
| 6,135,532 * 10/2000 | Martin | 296/61 |

* cited by examiner

Primary Examiner—Joseph D. Pape
Assistant Examiner—Lori L. Coletta
(74) Attorney, Agent, or Firm—Gigette Bejin, Esq.

(57) ABSTRACT

A multi position tailgate assembly (10) includes a tailgate (14), at least one hinge element (16), moveable between a closed position (20), and an opened position (22), and at least one cable element having a first end attached to an automobile and a second end attached to the hinge element (16). The assembly allows the tailgate to be opened to a first position when the hinge element is closed and a second, lower or angled position, when the hinge element is open.

16 Claims, 4 Drawing Sheets

MULTI-POSITION VEHICLE TAILGATE ASSEMBLY

TECHNICAL FIELD

The present invention relates generally to a multi-position vehicle tailgate assembly, and more particularly to a multi-position tailgate assembly utilizing cable extensions and anchored brackets.

BACKGROUND OF THE INVENTION

Automotive vehicles, such as pickup trucks, often have a tailgate attached to the vehicle body to allow access to a cargo bed area. When opened, a pair of cables are commonly used to retain the tailgate in an open position. The tailgate in the open position is typically held in approximate horizontal position. In the horizontal position, however, it can be difficult to load or unload large or heavy objects from the cargo bed area due to the high clearance height of the open tailgate.

Other difficulties loading large and heavy objects can arise from the use of ramps used to transport the object to the height of the tailgate and cargo bed area. When balancing ramps on the edge of a tailgate, a variety of difficulties can arise. Often, the distance between the edge of the tailgate and the position where the ramp is placed on the ground is great enough to cause excessive deflection in the ramp as objects are moved across it towards the cargo bed. In addition, when the object reaches the edge of the tailgate, overlap between the edge of the ramp and the edge of the tailgate can result in the ramp being "kicked up" when the object passes the edge of the tailgate. This is also highly undesirable. Finally, when unloading objects from the cargo bay area, such objects can potentially catch the edge of the ramp that extends past the edge of the tailgate and thereby knock the ramp out of position. All of the above situations can lead to difficulty loading and unloading large and heavy objects.

It is known that the aforementioned difficulties may be reduced by allowing the tailgate to be positioned in a secondary, non-horizontal position wherein the tailgate itself acts partially or completely as a ramp. Commonly, however, such a secondary position has been accomplished by simply detaching the cable supports from the truck bed. Detaching the cable supports, however, can produce its own set of problems. Contact between the tailgate and the rear bumper of the car can cause damage to the tailgate appearance especially when heavy forces are applied to the tailgate. In addition, improper reattachment of the support cables can pose a hazard to the truck operator during future use. Finally, permanent attachment of the cables can potentially allow a more sturdy rugged design.

It would, therefore, be highly desirable to have a multi-position tailgate assembly that provided the known loading and unloading functionality of such an angled tailgate but that did not require the detachment of the cables. In addition, it would be highly desirable to have a multi-position tailgate assembly that minimized potential damage to the tailgate, could be moved between positions with relative ease, and was sturdy and robust.

SUMMARY OF THE INVENTION

It is, therefore, an object of the present invention to provide a rugged multi-position tailgate assembly with simplicity of use, simplicity of construction, and that provides protection for the tailgate's outer panel.

In accordance with the objects of the present invention, a multi-position tailgate assembly is provided. The multi-position tailgate assembly includes a tailgate, two hinge elements attached to the tailgate, and a pair of cables securing the hinge elements to the truck bed.

The hinge elements move between an open position and a closed position. When the hinge elements are in the closed position, the tailgate is held in a primary open position. When the hinge elements are in the open position, the tailgate is held in a secondary open position.

Other objects and features of the present invention will become apparent when viewed in light of the detailed description of the preferred embodiment when taken in conjunction with the attached drawings and appended claims.

DESCRIPTION OF THE PREFERRED EMBODIMENT(S)

Figure 1:
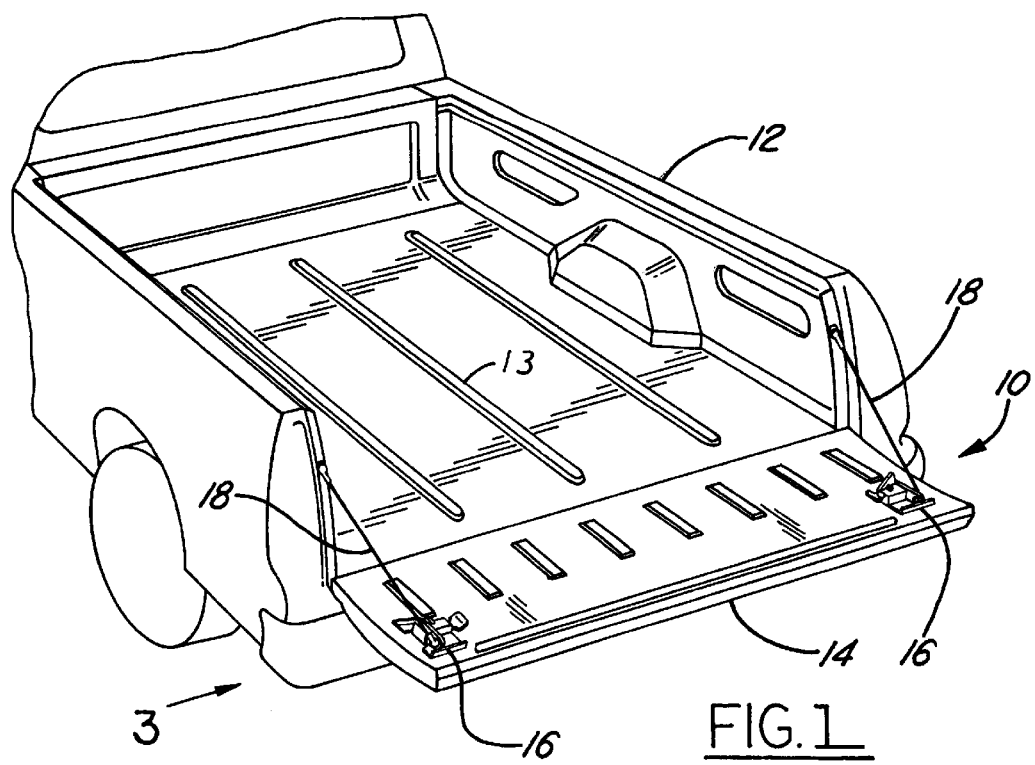
FIG. 1 is an illustration of a multi-position tailgate assembly in accordance with one embodiment of the present invention, with the tailgate in the primary open position.
Figure 7:
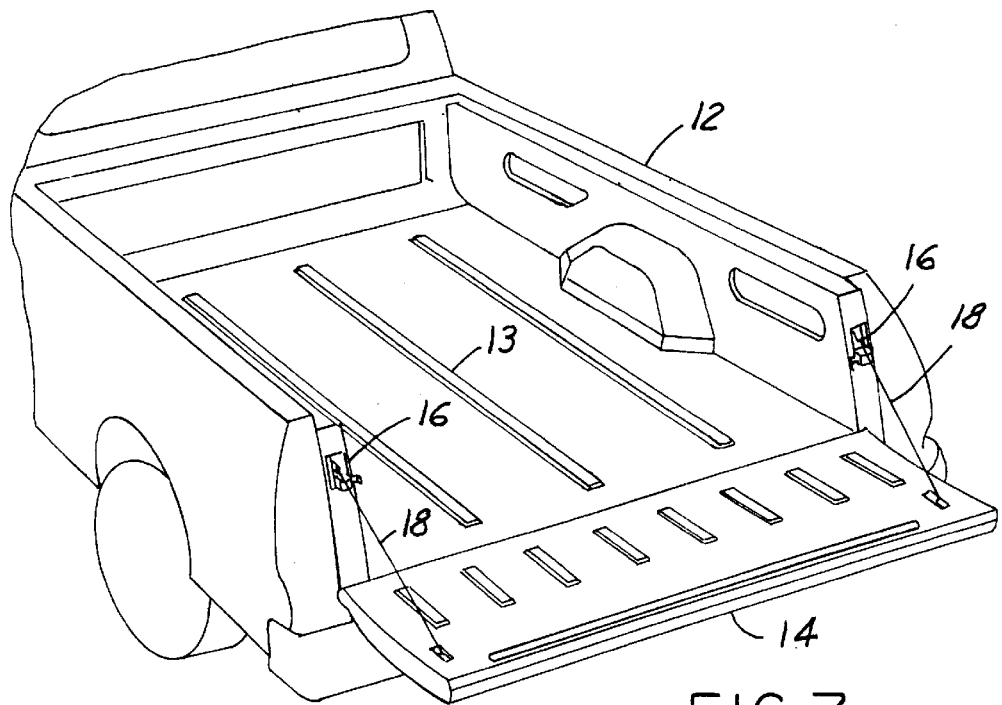
FIG. 7 is an illustration of a multi position tailgate assembly in accordance with one embodiment of the present invention, with the tailgate in the primary open position.
Figure 8:
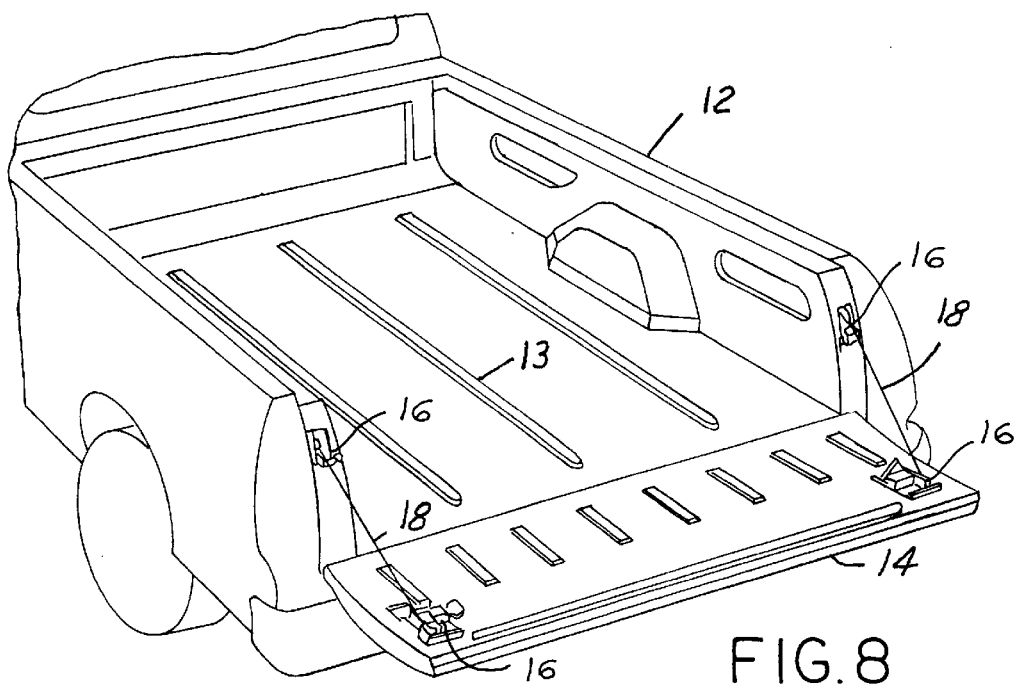
FIG. 8 is an illustration of a multi position tailgate assembly in accordance with another embodiment of the present invention, with the tailgate in the primary open position.

Referring now to FIG. 1, there is shown an illustration of a multi-position tailgate 10 in accordance with one embodiment of the present invention. The multi-position tailgate assembly 10 is illustrated mounted on an automobile 12 with the tailgate 14 in the primary open position. In this example, the primary open position corresponds to the tailgate 14 being coplanar with the vehicle cargo bed 13, approximately parallel to the ground. Multi-position tailgate assembly 10 further includes a pair of hinge elements 16 mounted to the tailgate 14. A pair of cable elements 18 attach to the automobile 12 on one end and attach to the hinge elements 16 on the opposing end, thereby supporting the tailgate 14 in the primary open position. It should be understood, however, that in an alternate embodiment (as seen in FIG. 7) the hinge element 16 may be alternately mounted on the automobile 12 and the cables 18 may be attached on one end to the hinge element 16 and to the tailgate 14 on the opposing end. In another embodiment (as seen in FIG. 8) hinge elements 16 may be mounted on both the automobile 12 and the tailgate 14. In this embodiment, the cables 18 are attached on one end to a hinge element 16 on the tailgate 14 and to a hinge element 16 on the automobile 12 on the opposing end. This allows for a plurality of tailgate open positions.

Figure 2:
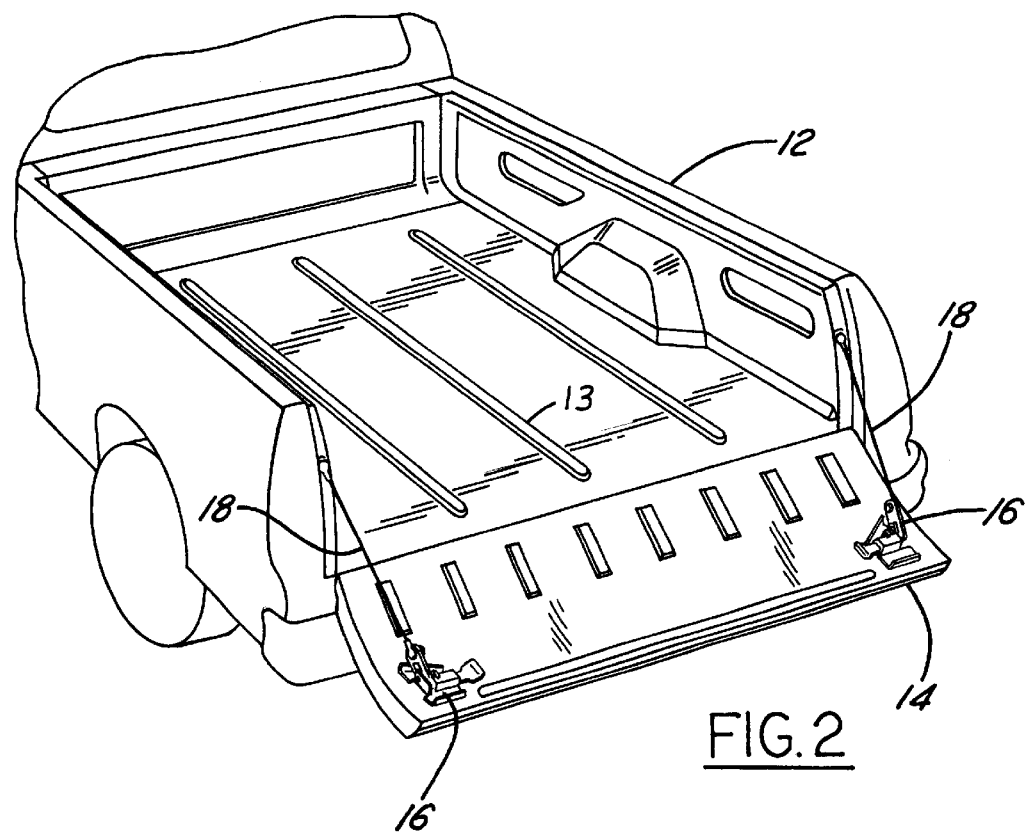
FIG. 2 is an illustration of the multi-position tailgate assembly of FIG. 1 with the tailgate in the secondary open position.

Referring now to FIG. 2, there is shown on an illustration of a multi-position tailgate assembly 10 in accordance with the present invention. The multi-position tailgate assembly 10 is shown in its secondary open position. In the secondary open position, the tailgate 14 is held at an angle relative to the vehicle cargo bed 13 to facilitate the loading and unloading of the cargo bed 13. The primary open position of the tailgate illustrated in FIG. 1 and the secondary open position of the tailgate illustrated in FIG. 2 are achieved through the use of the hinge elements 16.

Figure 3:
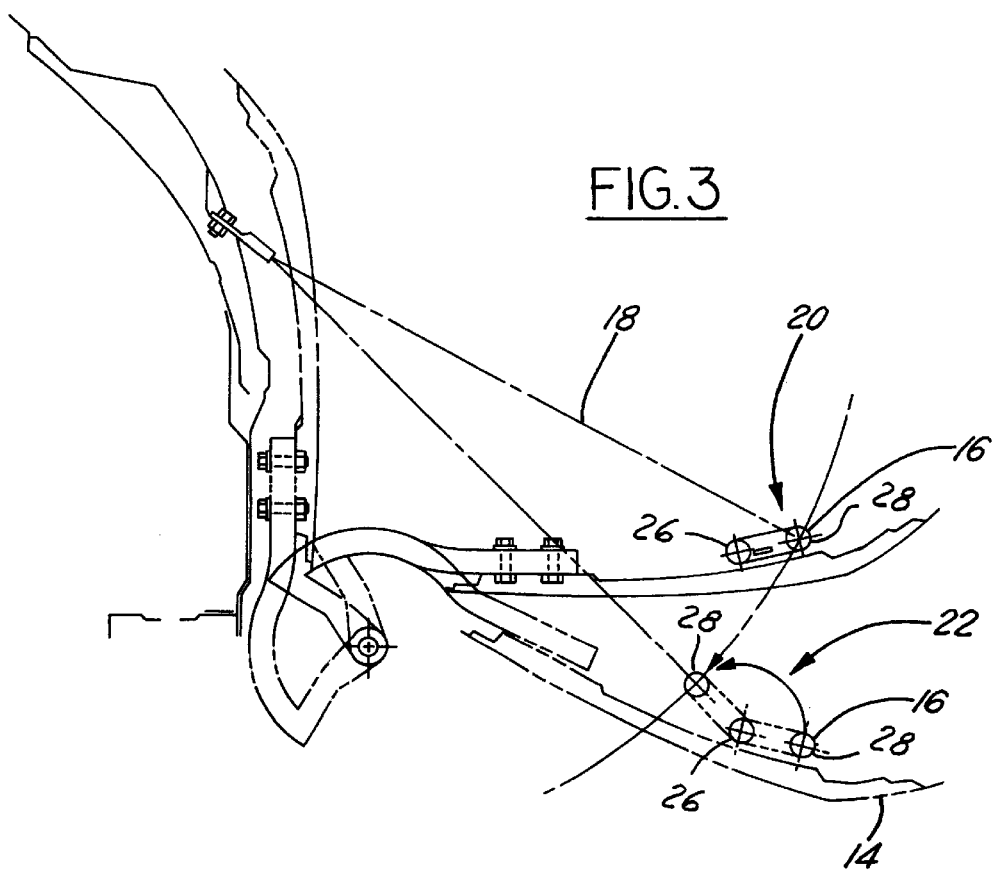
FIG. 3 is a cross-sectional illustration of a multi-position tailgate assembly as shown in FIGS. 1 and 2.

As illustrated in FIG. 3, the hinge elements 16 are moveable between a closed position 20 and an open position 22. When the hinge elements 16 are in the closed position 20, the tailgate 14 is held in the primary open position. When the hinge elements 16 are moved into the opened position 22, the effective length of the connection between the tailgate 14 and the vehicle 12 is extended thereby resulting in the tailgate 14 opening to the secondary open position. In this way, a tailgate assembly with a multi-position is achieved.

Figure 4:
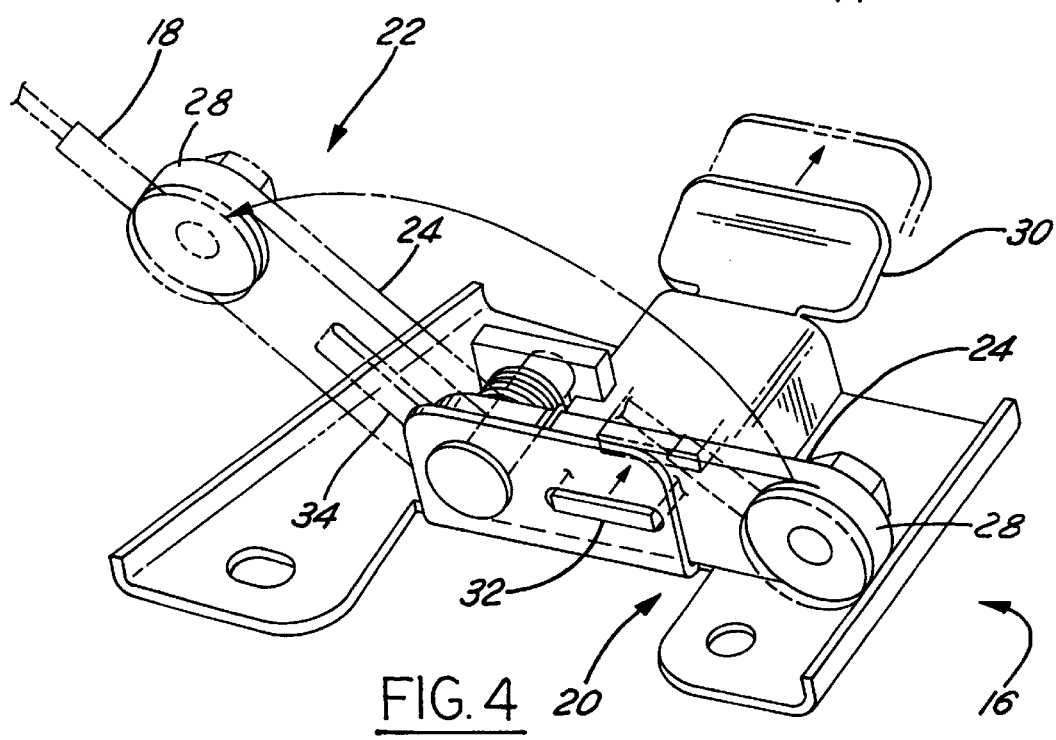
FIG. 4 is an illustration of a hinge element for use in the multi-position tailgate assembly in accordance with the present invention.

Referring now to FIG. 4, there is shown an illustration of a hinge element 16 for use in the present invention. Although a specific embodiment of a hinge element 16 is illustrated, it should be understood that a wide variety of hinge elements 16 are both known in the prior art and contemplated by this invention. The illustrated hinge element 16 includes a rotatable member 24. The rotatable member 24 has a rotatably fixed end 26 and a free end 28, which pivots about the fixed end 26.

The cable element 18 is attached to the hinge element 16 by connecting it to the free end 28 of the rotatable member 24. The hinge element 16 illustrated in FIG. 4 shows the rotatable member 24 in both the closed position 20 and the opened position 22.

Figure 5:
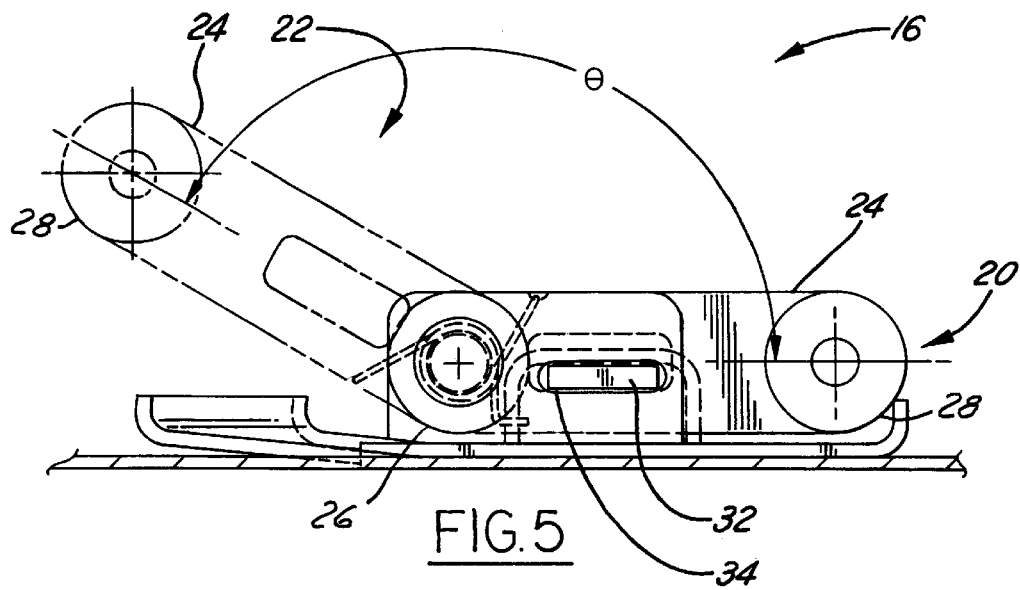
FIG. 5 is a side view of the hinge element illustrated in FIG. 4.
Figure 6:
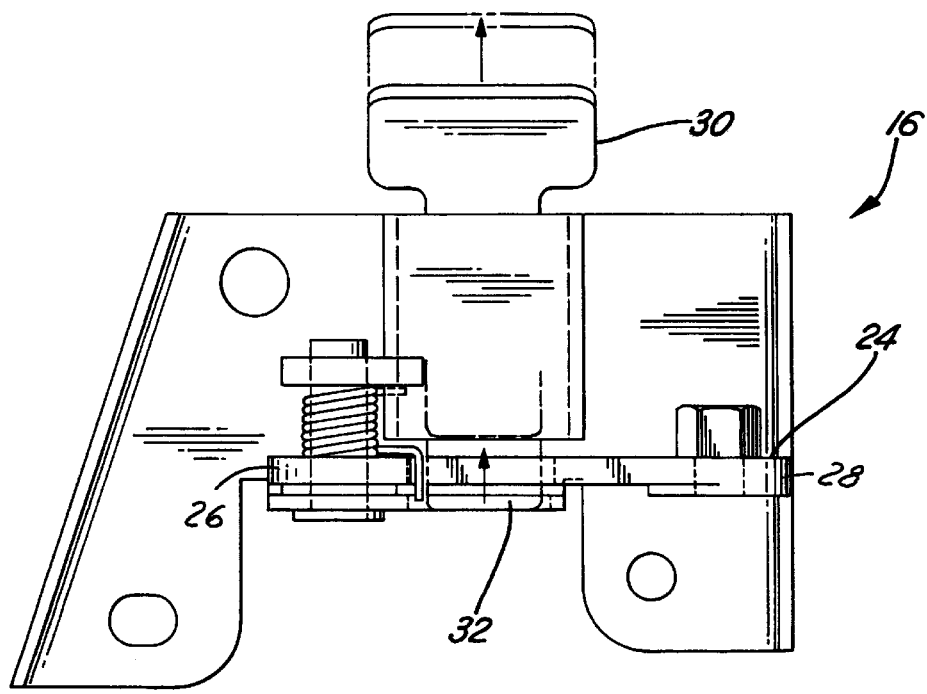
FIG. 6 is a top view of the hinge element illustrated in FIG. 4.

The hinge element 16 may further include a lock element 30. The lock element 30 can be used to hold the rotatable member 24 in the closed position 20. Although a variety of lock elements 30 are possible, in one embodiment, the lock element 30 includes a tab 32 that engages a slot 34 formed in the rotatable member 24 such that the rotatable member 24 is held in the closed position 20 when the lock element 30 is engaged. The lock element 30, the tab 32, and the slot 34 are further illustrated in FIGS. 5 and 6 for clarity.

The hinge element 16 may additionally include a spring element 36. Spring element 36 may be used to bias the rotating member 24 into the closed position 20. By biasing the rotating member 24 into the closed position 20, it becomes easier for an operator to engage or disengage the locking element 30. Although spring element 36 is shown, it should be understood that the spring element 36 is not required to practice the present invention. In addition, although the hinge element 16 and the cable elements 18 have been illustrated and described in pairs, it should be understood that the present invention can be practiced using only a single cable 18 and a single hinge 16.

While the invention has been described in connection with one or more embodiments, it is to be understood that the specific mechanisms and techniques which have been described are merely illustrative of the principles of the invention, numerous modifications may be made to the methods and apparatus described without departing from the spirit or scope of the invention as defined by the appended claims.

What is claimed is:

1. A multi-position tailgate assembly for use on an automobile comprising:

a tailgate;

at least one hinge element, said at least one hinge element moveable between a closed position and an opened position, said at least one hinge element positioned on said tailgate; and at least one cable element, said at least one cable element having a first end attached to the automobile, and a second end attached to said at least one hinge element;

wherein when said at least one hinge element is in said closed position, said tailgate is held in a primary open position and when said at least one hinge element is in said open position, said tailgate is held in a secondary open position.

2. A multi tailgate assembly as described in claim 1 wherein said hinge element includes a rotatable member, said rotatable member having a rotatably fixed end and a free end pivotable about said fixed end, said at least one cable element attaching to said free end.

3. A multi-position tailgate assembly as described in claim 1 further comprising a lock element, said lock element holding said at least one hinge element in said closed position when said locked element is engaged.

4. A multi-position tailgate assembly as described in claim 1 further comprising a spring element, said spring element biasing said hinge element towards said closed position.

5. A multi-position tailgate assembly as described in claim 1 wherein said at least one hinge element includes two hinges.

6. A multi-position tailgate assembly as described in claim 5 wherein said at least one cable element includes two cables.

7. A multi-position tailgate assembly as described in claim 3 wherein said lock element comprises:

a rotatable member including a slot;

and a moveable tab member adapted to engage said slot and prevent movement of said rotatable member.

8. A multi-position tailgate assembly as described in claim 1, further comprising:

at least one additional hinge element positioned on the automobile, wherein said first end of said at least one cable element attaches to the automobile by way of attaching to said at least one additional hinge element.

9. A multi position tailgate assembly for use on an automobile comprising:

a tailgate;

at least one hinge element, said at least one hinge element moveable between a closed position and an opened position, said at least one hinge element positioned on said automobile; and at least one cable element, said at least one cable element having a first end attached said tailgate, and a second end attached to said at least one hinge element;

wherein when said at least one hinge element is in said closed position, said tailgate is held in a primary open position and when said at least one hinge element is in said open position, said tailgate is held in a secondary open position.

10. A multi tailgate assembly as described in claim 9 wherein said hinge element includes a rotatable member, said rotatable member having a rotatably fixed end and a free end pivotable about said fixed end, said at least one cable element attaching to said free end.

11. A multi-position tailgate assembly as described in claim 9 further comprising a lock element, said lock element holding said at least one hinge element in said closed position when said locked element is engaged.

12. A multi-position tailgate assembly as described in claim 9 further comprising a spring element, said spring element biasing said hinge element towards said closed position.

13. A multi-position tailgate assembly as described in claim 9 wherein said at least one hinge element includes two hinges.

14. A multi-position tailgate assembly as described in claim 13 wherein said at least one cable element includes two cables.

15. A multi-position tailgate assembly as described in claim 11 wherein said lock element comprises:

a rotatable member including a slot;

and a moveable tab member adapted to engage said slot and prevent movement of said rotatable member.

16. A multi-position tailgate assembly as described in claim 9, further comprising:

at least one additional hinge element positioned on said tailgate, wherein said first end of said at least one cable element attaches to said tailgate by way of attaching to said at least one additional hinge element.

* * * * *